United States Patent
Lee et al.

(10) Patent No.: US 11,702,536 B2
(45) Date of Patent: Jul. 18, 2023

(54) THERMOPLASTIC RESIN COMPOSITION, METHOD OF PREPARING THERMOPLASTIC RESIN COMPOSITION, AND METAL-PLATED MOLDED ARTICLE MANUFACTURED USING THERMOPLASTIC RESIN COMPOSITION

(71) Applicant: LG CHEM, LTD., Seoul (KR)

(72) Inventors: Ju Hyeong Lee, Daejeon (KR); Byoung Il Kang, Daejeon (KR); Seo Hwa Kim, Daejeon (KR); Sejin Han, Daejeon (KR); Seongkyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 558 days.

(21) Appl. No.: 16/758,381

(22) PCT Filed: Sep. 6, 2019

(86) PCT No.: PCT/KR2019/011553
§ 371 (c)(1),
(2) Date: Apr. 22, 2020

(87) PCT Pub. No.: WO2020/060085
PCT Pub. Date: Mar. 26, 2020

(65) Prior Publication Data
US 2020/0325325 A1     Oct. 15, 2020

(30) Foreign Application Priority Data

Sep. 21, 2018  (KR) .................. 10-2018-0113686
Sep. 3, 2019   (KR) .................. 10-2019-0108923

(51) Int. Cl.
| | |
|---|---|
| C08L 55/02 | (2006.01) |
| B29C 45/00 | (2006.01) |
| C08L 83/04 | (2006.01) |
| B29K 55/02 | (2006.01) |
| B29K 83/00 | (2006.01) |
| C08K 5/01 | (2006.01) |
| C08K 5/315 | (2006.01) |

(52) U.S. Cl.
CPC .......... *C08L 55/02* (2013.01); *B29C 45/0001* (2013.01); *C08L 83/04* (2013.01); *B29K 2055/02* (2013.01); *B29K 2083/00* (2013.01); *C08K 5/01* (2013.01); *C08K 5/315* (2013.01)

(58) Field of Classification Search
CPC ...... C08L 55/02; C08L 83/04; B29C 45/0001; B29K 2055/02; B29K 2083/00; C08K 5/01; C08K 5/315
USPC ......................................................... 525/64
See application file for complete search history.

(56) References Cited

U.S. PATENT DOCUMENTS

| | | | |
|---|---|---|---|
| 4,248,778 A | 2/1981 | Arnold et al. | |
| 2010/0048798 A1 | 2/2010 | You et al. | |

FOREIGN PATENT DOCUMENTS

| | | |
|---|---|---|
| CN | 101665606 A | 3/2010 |
| CN | 103396617 A | 11/2013 |
| CN | 107922736 A | 4/2018 |
| JP | 1983-011540 A | 1/1983 |
| JP | 1998-046003 A | 2/1998 |
| JP | 2007-144691 A | 6/2007 |
| JP | 2017-101255 A | 6/2017 |
| KR | 19980043646 A | 9/1998 |
| KR | 10-2000-0055264 A | 9/2000 |
| KR | 10-0292878 B1 | 6/2001 |
| KR | 1020060074462 A | 7/2006 |
| KR | 10-0700683 B1 | 3/2007 |
| KR | 10-0730413 B1 | 6/2007 |
| KR | 10-0985334 B1 | 10/2010 |
| KR | 10-2014-0147285 A | 12/2014 |
| KR | 20140147319 A | 12/2014 |
| KR | 20150067482 A | 6/2015 |
| KR | 10-1720375 B1 | 3/2017 |
| KR | 20170047552 A * | 5/2017 |
| KR | 20180048826 A * | 5/2018 |
| KR | 10-2018-0077437 A | 7/2018 |
| WO | WO2015162239 A1 | 10/2015 |
| WO | WO2018145970 A1 | 8/2018 |

OTHER PUBLICATIONS

India Office Action for related Application No. 202017016659, dated Mar. 30, 2022.
Search Report and Written Opinion for related European Patent Application No. 19861237.6, dated Nov. 16, 2020.

* cited by examiner

*Primary Examiner* — Ling Siu Choi
*Assistant Examiner* — Ronald Grinsted

(57) ABSTRACT

A thermoplastic resin composition includes 100 parts by weight of a base resin including 5 to 40% by weight of a vinyl cyanide compound-conjugated diene rubber-aromatic vinyl compound graft copolymer (a) containing conjugated diene rubber having a particle diameter of 0.05 μm to 0.2 μm, 5 to 40% by weight of a vinyl cyanide compound-conjugated diene rubber-aromatic vinyl compound graft copolymer (b) containing conjugated diene rubber having a particle diameter of greater than 0.2 μm and less than or equal to 0.5 μm, and 50 to 80% by weight of an aromatic vinyl compound-vinyl cyanide compound copolymer (c); and more than 0.01 parts by weight and less than 2 parts by weight of a compound having a kinematic viscosity (25° C.) greater than 5 cSt and less than 200 cSt. The resin composition has excellent plating characteristics.

15 Claims, No Drawings

THERMOPLASTIC RESIN COMPOSITION, METHOD OF PREPARING THERMOPLASTIC RESIN COMPOSITION, AND METAL-PLATED MOLDED ARTICLE MANUFACTURED USING THERMOPLASTIC RESIN COMPOSITION

CROSS-REFERENCE TO RELATED APPLICATIONS

The present application is a National Phase of International Application No.: PCT/KR2019/011553 filed on Sep. 6, 2019, which claims priority to Korean Patent Application No. 10-2018-0113686, filed on Sep. 21, 2018, and Korean Patent Application No. 10-2019-0108923, re-filed on Sep. 3, 2019, based on the priority of the above patent, in the Korean Intellectual Property Office, the disclosures of each of which are incorporated herein by reference.

TECHNICAL FIELD

The present invention relates to a thermoplastic resin composition, a method of preparing the thermoplastic resin composition, and a metal-plated molded article manufactured using the thermoplastic resin composition More specifically, according to the present invention, when the thermoplastic resin composition of the present invention is plated, non-plating is prevented even under conditions, such as reduced etching time, that promotes occurrence of a non-plating phenomenon. In addition, the thermoplastic resin composition of the present invention has mechanical properties equal or superior to those of conventional resins and excellent thermal properties and plating adhesion. Accordingly, after the thermoplastic resin composition is plated, the thermoplastic resin composition has excellent appearance.

BACKGROUND ART

ABS-based resins represented by acrylonitrile-butadiene-styrene (hereinafter referred to as ABS) are widely used in various fields such as automobile parts, electrical/electronic products, and office equipment due to rigidity and chemical resistance of acrylonitrile and processability, mechanical strength, and aesthetics of butadiene and styrene.

In general, the ABS-based resins are plated.

However, during plating, the reliability and appearance of products may be deteriorated due to low plating adhesion and the occurrence of a non-plating phenomenon. Therefore, to overcome these problems, a method of controlling plating conditions such as solution composition, process time, and temperature, a method of increasing the amount of rubber, a method of simplifying the shape of a molded article in an injection molding process, and the like have been proposed.

However, these methods may increase process costs, may cause deterioration in thermal cycle properties by increasing the coefficient of linear expansion, and may have limitations in terms of product design.

Therefore, there is increasing demand for a thermoplastic resin composition that has improved plating adhesion while maintaining the inherent mechanical properties of ABS-based resins, and that can solve problems such as the increase in process costs, deterioration in thermal properties, and occurrence of a non-plating phenomenon.

RELATED ART DOCUMENTS

Patent Documents (Patent Document 1) KR 10-2015-0067482 A

DISCLOSURE

Technical Problem

Therefore, the present invention has been made in view of the above problems, and it is one object of the present invention to provide a thermoplastic resin composition, a method of preparing the thermoplastic resin composition, and a metal-plated molded article manufactured using thermoplastic resin composition. According to the present invention, when the thermoplastic resin composition of the present invention is plated, non-plating may be prevented even under conditions, such as reduced etching time, that promote the occurrence of a non-plating phenomenon. In addition, the thermoplastic resin composition of the present invention has mechanical properties equal or superior to those of conventional resins and excellent thermal properties and plating adhesion. Accordingly, after the thermoplastic resin composition is plated, the thermoplastic resin composition has excellent appearance.

The above and other objects can be accomplished by the present disclosure described below.

Technical Solutions

In accordance with one aspect of the present invention, provided is a thermoplastic resin composition including 100 parts by weight of a base resin including 5 to 40% by weight of a vinyl cyanide compound-conjugated diene rubber-aromatic vinyl compound graft copolymer (a) containing conjugated diene rubber having a particle diameter of 0.05 µm to 0.2 µm, 5 to 40% by weight of a vinyl cyanide compound-conjugated diene rubber-aromatic vinyl compound graft copolymer (b) containing conjugated diene rubber having a particle diameter of greater than 0.2 µm and less than or equal to 0.5 µm, and 50 to 80% by weight of an aromatic vinyl compound-vinyl cyanide compound copolymer (c); and more than 0.01 parts by weight and less than 2 parts by weight of a compound represented by Formula 1 below:

[Formula 1]

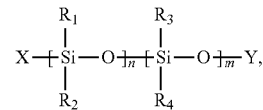

wherein X is hydrogen or a hydroxyl group, Y is hydrogen or

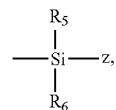

$R_1$ and $R_2$ are each independently an alkyl group having 1 to 10 carbon atoms, $R_3$ and $R_4$ are each independently an aryl group having 6 to 12 carbon atoms or an alkyl group having 1 to 1 t carbon atoms, $R_5$ and $R_6$ are each independently an alkyl group having 1 to 10 carbon atoms, Z is hydrogen or a hydroxyl group, n is an integer of 1 to 100, and m is an integer of 0 to 100, wherein a content of the vinyl cyanide compound-conjugated diene rubber-aromatic vinyl compound graft copolymer (a) is less than a content of the vinyl cyanide compound-conjugated diene rubber-aromatic vinyl compound graft copolymer (b), and a kinematic viscosity (25° C.) of the compound represented by Formula 1 is greater than 5 cSt and less than 200 cSt.

The weight ratio of the vinyl cyanide compound-conjugated diene rubber-aromatic vinyl compound graft copolymer (a) to the vinyl cyanide compound-conjugated diene rubber-aromatic vinyl compound graft copolymer (b) may be 1:1.5 to 4.

The compound represented by Formula 1 may have a kinematic viscosity (25° C.) of 10 to 99 cSt.

The vinyl cyanide compound-conjugated diene rubber-aromatic vinyl compound graft copolymer (a) may be prepared by graft-polymerizing 30 to 70% by weight of conjugated diene rubber having a particle diameter of 0.05 μm to 0.2 μm, 5 to 30% by weight of a vinyl cyanide compound, and 15 to 50% by weight of an aromatic vinyl compound.

The vinyl cyanide compound-conjugated diene rubber-aromatic vinyl compound graft copolymer (b) may be prepared by graft-polymerizing 40 to 80% by weight of conjugated diene rubber having a particle diameter of greater than 0.2 μm and less than or equal to 0.5 μm, 3 to 20% by weight of a vinyl cyanide compound, and 10 to 50% by weight of an aromatic vinyl compound.

The aromatic vinyl compound-vinyl cyanide compound copolymer (c) may include 55 to 85% by weight of an aromatic vinyl compound and 15 to 45% by weight of a vinyl cyanide compound.

The thermoplastic resin composition may have a plating adhesion (10 mm/80 mm) of 10 N/cm or more.

The thermoplastic resin composition may have a melt index (220° C., 10 kg) of 10 to 40 g/10 min.

The thermoplastic resin composition may be a resin composition for plating.

The thermoplastic resin composition may further include one or more selected from the group consisting of heat stabilizers, antioxidants, impact modifiers, light stabilizers, plasticizers, lubricants, and antistatic agents.

In accordance with another aspect of the present invention, provided is a method of preparing a thermoplastic resin composition, the method including feeding a thermoplastic resin composition into a twin-screw extruder and melt-kneading and extruding the thermoplastic resin composition, wherein the thermoplastic resin composition includes 100 parts by weight of a base resin including 5 to 40% by weight of a vinyl cyanide compound-conjugated diene rubber-aromatic vinyl compound graft copolymer (a) containing conjugated diene rubber having a particle diameter of 0.05 μm to 0.2 μm, 5 to 40% by weight of a vinyl cyanide compound-conjugated diene rubber-aromatic vinyl compound graft copolymer (b) containing conjugated diene rubber having a particle diameter of greater than 0.2 μm and less than or equal to 0.5 μm, and 50 to 80% by weight of an aromatic vinyl compound-vinyl cyanide compound copolymer (c); and more than 0.01 parts by weight and less than 2 parts by weight of a compound represented by Formula 1 below:

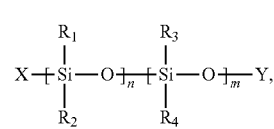

[Formula 1]

wherein X is hydrogen or a hydroxyl group, Y is hydrogen or

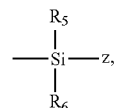

$R_1$ and $R_2$ are each independently an alkyl group having 1 to 10 carbon atoms, $R_3$ and $R_4$ are each independently an aryl group having 6 to 12 carbon atoms or an alkyl group having 1 to 10 atoms, $R_5$ and $R_6$ are each independently an alkyl group having 1 to 10 carbon atoms, Z is hydrogen or a hydroxyl group, n is an integer of 1 to 100, and m is an integer of 0 to 100, wherein a content of the vinyl cyanide compound-conjugated diene rubber-aromatic vinyl compound graft copolymer (a) is less than a content of the vinyl cyanide compound-conjugated diene rubber-aromatic vinyl compound graft copolymer (b), and a kinematic viscosity (25° C.) of the compound represented by Formula 1 is greater than 5 cSt and less than 200 cSt.

In accordance with still another aspect of the present invention, provided is a metal-plated molded article, wherein the metal-plated molded article is manufactured by molding the thermoplastic resin composition of the present invention, and a metal plating layer is formed on a surface of the metal-plated molded article.

The metal plating layer may be formed using one or more selected from the group consisting of copper, nickel, and chromium.

The metal-plated molded article may be an interior or exterior material for automobiles.

In accordance with yet another aspect of the present invention, provided is a method of manufacturing a metal-plated molded article, the method including injection-molding the thermoplastic resin composition to obtain an injection-molded article; etching the injection-molded article using an etching solution; and plating the etched injection-molded article.

Advantageous Effects

As apparent from the foregoing, the present invention advantageously provides a thermoplastic resin composition, a method of preparing the thermoplastic resin composition, and a metal-plated molded article manufactured using the thermoplastic resin composition. According to the present invention, when the thermoplastic resin composition of the present invention is plated, non-plating can be prevented even under conditions, such as reduced etching time or reduced temperature, that promote the occurrence of a non-plating phenomenon. In addition, the thermoplastic resin composition of the present invention has mechanical properties, such as impact strength and fluidity, that are equal or superior to those of conventional resins, and has excellent thermal properties and plating adhesion. Accordingly, after the thermoplastic resin composition is plated, the thermoplastic resin composition has excellent appearance.

BEST MODE

Hereinafter, a thermoplastic resin composition of the present invention, a method of preparing the thermoplastic resin composition, and a metal-plated molded article manufactured using the thermoplastic resin composition will be described in detail.

The present inventors confirmed that, when two types of ABS-based resins each containing rubber particles having different particle diameters, an aromatic vinyl compound-vinyl cyanide compound copolymer, and a polysiloxane having a specific kinematic viscosity value were mixed within specific content ranges, etching time was decreased and plating adhesion was increased without deterioration in mechanical and thermal properties and occurrence of a non-plating phenomenon. Based on these results, the present inventors completed the present invention.

The thermoplastic resin composition of the present invention includes 100 parts by weight of a base resin including 5 to 40% by weight of a vinyl cyanide compound-conjugated diene rubber-aromatic vinyl compound graft copolymer (a) containing conjugated diene rubber having a particle diameter of 0.05 μm to 0.2 μm, 5 to 40% by weight of a vinyl cyanide compound-conjugated diene rubber-aromatic vinyl compound graft copolymer (b) containing conjugated diene rubber having a particle diameter of greater than 0.2 μm and less than or equal to 0.5 μm, and 50 to 80% by weight of an aromatic vinyl compound-vinyl cyanide compound copolymer (c); and 0.01 to 2 parts by weight of a compound represented by Formula 1 below:

[Formula 1]

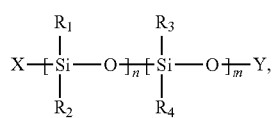

wherein X is hydrogen or a hydroxyl group, Y is hydrogen or

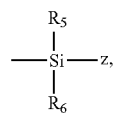

$R_1$ and $R_2$ are each independently an alkyl group having 1 to 10 carbon atoms, $R_3$ and $R_4$ are each independently an aryl group having 6 to 12 carbon atoms or an alkyl group having 1 to 10 carbon atoms, $R_5$ and $R_6$ are each independently an alkyl group having 1 to 10 carbon atoms, Z is hydrogen or a hydroxyl group, n is an integer of 1 to 100, and m is an integer of 0 to 100), wherein the kinematic viscosity (25° C.) of the compound represented by Formula 1 is 10 to 20,000 cSt. According to the present invention, non-plating may be prevented under conditions that promote the occurrence of a non-plating phenomenon. In addition, the thermoplastic resin composition of the present invention may have excellent thermal properties, plating adhesion, and appearance while maintaining mechanical properties equal or superior to those of conventional resins.

Preferably, the thermoplastic resin composition of the present invention includes 100 parts by weight of a base resin including 5 to 40% by weight of a vinyl cyanide compound-conjugated diene rubber-aromatic vinyl compound graft copolymer (a) containing conjugated diene rubber having a particle diameter of 0.05 μm to 0.2 μm, 5 to 40% by weight of a vinyl cyanide compound-conjugated diene rubber-aromatic vinyl compound graft copolymer (b) containing conjugated diene rubber having a particle diameter of greater than 0.2 μm and less than or equal to 0.5 μm, and 50 to 80% by weight of an aromatic vinyl compound-vinyl cyanide compound copolymer (c); and more than 0.01 parts by weight and less than 2 parts by weight of a compound represented by Formula 1 below:

[Formula 1]

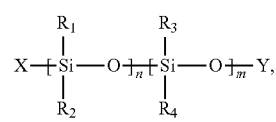

wherein X is hydrogen or a hydroxyl group, Y is hydrogen or

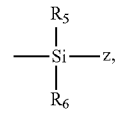

$R_1$ and $R_2$ are each independently an alkyl group having 1 to 10 carbon atoms, $R_3$ and $R_4$ are each independently an aryl group having 6 to 12 carbon atoms or an alkyl group having 1 to 10 carbon atoms, $R_5$ and $R_6$ are each independently an alkyl group having 1 to 10 carbon atoms, Z is hydrogen or a hydroxyl group, n is an integer of to 100, and m is an integer of 0 to 100, wherein the content of the vinyl cyanide compound-conjugated diene rubber-aromatic vinyl compound graft copolymer (a) is less than that of the vinyl cyanide compound-conjugated diene rubber-aromatic vinyl compound graft copolymer (b), and the kinematic viscosity (25° C.) of the compound represented by Formula 1 is greater than 5 cSt and less than 200 cSt. According to the present invention, non-plating may be prevented, and the thermoplastic resin composition of the present invention may have excellent plating adhesion, thermal properties, and appearance. In addition, the thermoplastic resin composition may be suitable as a resin composition for plating due to excellent processability.

Base Resins

For example, the vinyl cyanide compound-conjugated diene rubber-aromatic vinyl compound graft copolymer (a) and the vinyl cyanide compound-conjugated diene rubber-aromatic vinyl compound graft copolymer (b) may each be a copolymer prepared by graft-polymerizing a vinyl cyanide compound and an aromatic vinyl compound onto conjugated diene rubber.

For example, the conjugated diene rubber may be latex prepared by dispersing conjugated diene rubber particles in water in a colloidal state. In this case, mechanical strength and processability may be excellent.

The conjugated diene rubber refers to a polymer or a copolymer prepared by polymerizing conjugated diene compounds each having a structure in which a double bond and a single bond are alternately present. For example, the conjugated diene rubber may include one or more selected from the group consisting of butadiene polymers, butadiene-styrene copolymers, and butadiene-acrylonitrile copolymers. In this case, mechanical properties may be excellent.

For example, the conjugated diene rubber of the vinyl cyanide compound-conjugated diene rubber-aromatic vinyl compound graft copolymer (a) may have a particle diameter of 0.05 μm to 0.2 μm, 0.05 μm to 0.17 μm, or 0.07 μm to 0.15 μm. Within this range, mechanical properties, thermal properties, and plating adhesion may be excellent.

For example, the conjugated diene rubber of the vinyl cyanide compound-conjugated diene rubber-aromatic vinyl compound graft copolymer (b) may have a particle diameter of greater than 0.2 μm and less than or equal to 0.5 μm, 0.25 μm to 0.45 μm, or 0.3 μm to 0.4 μm. Within this range, mechanical properties, processability, and plating properties may be excellent.

In the present invention, the particle diameter of the conjugated diene rubber means average particle diameter of conjugated diene rubber particles. For example, the particle diameter of conjugated diene rubber may be measured using dynamic laser light scattering and intensity Gaussian distribution (Nicomp 380).

For example, the vinyl cyanide compound may include one or more selected from the group consisting of acrylonitrile, methacrylonitrile, ethacrylonitrile, and derivatives thereof, preferably acrylonitrile. In this case, mechanical strength and processability may be excellent.

For example, the aromatic vinyl compound may include one or more selected from the group consisting of styrene, α-methylstyrene, ρ-methylstyrene, o-ethylstyrene, ρ-ethylstyrene, vinyltoluene, and derivatives thereof. In this case, mechanical properties and plating properties may be excellent.

For example, the base resin may include 5 to 40% by weight of the vinyl cyanide compound-conjugated diene rubber-aromatic vinyl compound graft copolymer (a), 5 to 40% by weight of the vinyl cyanide compound-conjugated diene rubber-aromatic vinyl compound graft copolymer (b), and 50 to 80% by weight of the aromatic vinyl compound-vinyl cyanide compound copolymer (c). In this case, thermal and mechanical properties and plating adhesion may be excellent.

For example, the vinyl cyanide compound-conjugated diene rubber-aromatic vinyl compound graft copolymer (a) may be included in an amount of 5 to 40% by weight, 10 to 35% by weight, or 10 to 30% by weight, preferably 10 to 15% by weight. Within this range, fluidity, mechanical strength, plating adhesion, and thermal properties may be excellent.

For example, the vinyl cyanide compound-conjugated diene rubber-aromatic vinyl compound graft copolymer (b) may be included in an amount of 5 to 40% weight, 10 to 35% by weight, or 10 to 30% by weight, preferably 20 to 30% by weight, more preferably 20% by weight or more and less than 25% by weight. Within this range, fluidity, mechanical strength, plating adhesion, and thermal properties may be excellent.

For example, the aromatic vinyl compound-vinyl cyanide compound copolymer (c) may be included in an amount of 50 to 80% by weight, 55 to 75% by weight, or 60 to 70% by weight, preferably more than 60% by weight and less than or equal to 70% by weight. Within this range, mechanical strength, such as impact strength, and plating adhesion may be excellent.

Preferably, the content of the vinyl cyanide compound-conjugated diene rubber-aromatic vinyl compound graft copolymer (a) is less than that of the vinyl cyanide compound-conjugated diene rubber-aromatic vinyl compound graft copolymer (b). In this case, processability, which is associated with fluidity, may be excellent. In addition, due to excellent thermal properties, no bulges or cracks occur in a plating film after heat shock evaluation.

The weight ratio of the vinyl cyanide compound-conjugated diene rubber-aromatic vinyl compound graft copolymer (a) to the vinyl cyanide compound-conjugated diene rubber-aromatic vinyl compound graft copolymer (b) is preferably 1:1.5 to 4, more preferably 1:1.5 to 3, still more preferably 1:1.7 to 3, most preferably 1:2 to 3. Within this range, fluidity may be excellent. In addition, due to excellent thermal properties, no bulges or cracks occur in a plating film after heat shock evaluation.

For example, the vinyl cyanide compound-conjugated diene rubber-aromatic vinyl compound graft copolymer (a) may be prepared by graft-polymerizing 30 to 70% by weight of conjugated diene rubber having a particle diameter of 0.05 μm to 0.2 μm, 5 to 30% by weight of a vinyl cyanide compound, and 15 to 50% by weight of an aromatic vinyl compound. In this case, overall physical properties, such as mechanical properties, plating adhesion, and thermal properties may be excellent.

As another example, the vinyl cyanide compound-conjugated diene rubber-aromatic vinyl compound graft copolymer (a) may be prepared by graft-polymerizing 45 to 60% by weight of conjugated diene rubber having a particle diameter of 0.05 μm to 0.2 μm, 10 to 20% by weight of a vinyl cyanide compound, and 25 to 40% by weight of an aromatic vinyl compound. In this case, overall physical properties, such as mechanical properties, plating adhesion, and thermal properties may be excellent.

For example, the vinyl cyanide compound-conjugated diene rubber-aromatic vinyl compound graft copolymer (b) may be prepared by graft-polymerizing 40 to 80% by weight of conjugated diene rubber having a particle diameter of greater than 0.2 μm and less than or equal to 0.5 μm, 3 to 20% by weight of a vinyl cyanide compound, and 10 to 50% by weight of an aromatic vinyl compound. In this case, overall physical properties, such as mechanical properties, plating adhesion, and thermal properties may be excellent.

As another example, the vinyl cyanide compound-conjugated diene rubber-aromatic vinyl compound graft copolymer (b) may be prepared by graft-polymerizing 50 to 70% by weight of conjugated diene rubber having a particle diameter of greater than 0.2 μm and less than or equal to 0.5 μm, 5 to 15% by weight of a vinyl cyanide compound, and 20 to 40% by weight of an aromatic vinyl compound. In this case, mechanical strength, such as impact strength, plating adhesion, and thermal properties may be excellent.

Methods of preparing graft copolymers commonly used in the art may be used to prepare the vinyl cyanide compound-conjugated diene rubber-aromatic vinyl compound graft copolymer (a) and the vinyl cyanide compound-conjugated diene rubber-aromatic vinyl compound graft copolymer (b) without particular limitation. For example, emulsion polymerization may be used to prepare the vinyl cyanide compound-conjugated diene rubber-aromatic vinyl compound graft copolymer (a) and the vinyl cyanide compound-conjugated diene rubber-aromatic vinyl compound graft copolymer (b). In this case, due to excellent graft efficiency, mechanical properties and processability may be excellent.

The aromatic vinyl compound-vinyl cyanide compound copolymer (c) is a non-graft copolymer prepared by polymerizing an aromatic vinyl compound and a vinyl cyanide compound. For example, the aromatic vinyl compound may be contained in an amount of 55 to 85% by weight, 55 to 75% by weight, or 60 to 70% by weight based on a total weight of the aromatic vinyl compound-vinyl cyanide compound copolymer (c), and the vinyl cyanide compound may be contained in an amount of 15 to 45% by weight, 20 to 40% by weight, or 20 to 35% by weight based on a total weight of the aromatic vinyl compound-vinyl cyanide compound copolymer (c). Within this range, fluidity, mechanical properties, and plating adhesion may be excellent.

For example, in the aromatic vinyl compound-vinyl cyanide compound copolymer (c), the aromatic vinyl compound may include one or more selected from the group consisting of styrene, α-methylstyrene, p-methylstyrene, o-ethylstyrene, p-ethylstyrene, and vinyitoluene, and the vinyl cyanide compound may include one or more selected from the group consisting of acrylonitrile, methacrylonitrile, and ethacrylonitrile. In this case, processability, mechanical strength, and plating adhesion may be excellent.

For example, the aromatic vinyl compound-vinyl cyanide compound copolymer (c) may have a weight average molecular weight of 50,000 to 200,000 g/mol, 60,000 to 180,000 g/mol, or 70,000 to 150,000 g/mol. Within this range, mechanical strength, such as impact strength, and plating adhesion may be excellent.

For example, a resin is dissolved in tetrahydrofuran (THF) at a concentration of 1 mg/ml, the dissolved resin is filtered using a 0.45 μm syringe filer, and the weigh average molecular weight of the resin is measured by gel chromatography (GPC).

Methods of preparing copolymers commonly used in the art may be used to prepare the aromatic vinyl compound-vinyl cyanide compound copolymer (c) without particular limitation. For example, continuous bulk polymerization may be used. In this case, production costs may be reduced, and mechanical properties may be improved.

Compound Represented by Formula 1

For example, the thermoplastic resin composition of the present invention may include a compound represented by Formula 1 below in an amount of 0.01 to 2 parts by weight, preferably more than 0.01 parts by weight and less than 2 parts by weight, more preferably 0.03 to 1.5 parts by weight, still more preferably 0.05 to 1 parts by weight, most preferably more than 0.05 parts by weight and less than 1 parts by weight based on 100 parts by weight of a base resin. In this case, plating adhesion and appearance may be excellent without deterioration in mechanical properties.

[Formula 1]

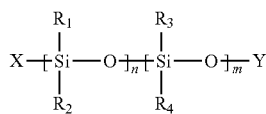

In Formula 1, for example, X may be hydrogen or a hydroxyl group, Y may be hydrogen or

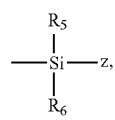

$R_1$ and $R_2$ may each independently be an alkyl group having 1 to 10 carbon atoms, $R_3$ and $R_4$ may each independently be an aryl group having 6 to 12 carbon atoms or an alkyl group having 1 to 10 carbon atoms, $R_5$ and $R_6$ may each independently be an alkyl group having 1 to 10 carbon atoms, Z may be hydrogen or a hydroxyl group, n may be an integer of 1 to 100, and m may be an integer of 0 to 100. According to the present invention, non-plating may be prevented under conditions that promote the occurrence of a non-plating phenomenon. In addition, the thermoplastic resin composition of the present invention may have excellent thermal properties, plating adhesion, and appearance while maintaining mechanical properties equal or superior to those of conventional resins.

For example, $R_1$ and $R_2$ may each independently be an alkyl group having 1 to 10 carbon atoms, an alkyl group having 1 to 5 carbon atoms, or an alkyl group having 1 to 3 carbon atoms. In this case, plating adhesion may be greatly improved, and thus appearance may be excellent after plating.

For example, $R_3$ and $R_4$ may each independently be an aryl group having 6 to 12 carbon atoms or an alkyl group having 1 to 10 carbon atoms. As another example, $R_3$ and $R_4$ may each independently be an aryl group having 6 to 8 carbon atoms or an alkyl group having 1 to 5 carbon atoms. As still another example, $R_3$ and $R_4$ may each independently be a phenyl group. In this case, occurrence of non-plating may be prevented, and plating adhesion may be excellent.

For example, $R_5$ and $R_5$ may each independently be an alkyl group having 1 to 10 carbon atoms, an alkyl group having 1 to 5 carbon atoms, or an alkyl group having 1 to 3 carbon atoms. In this case, plating adhesion may be greatly improved, and thus appearance may be excellent after plating.

For example, n may be an integer of 1 to 100, an integer of 10 to 90, or an integer of 20 to 80. In this case, appearance and plating adhesion may be excellent without deterioration in thermal properties.

For example, m may be an integer of 0 to 100, an integer of 1 to 80, or an integer of 10 to 60. In this case, appearance and plating adhesion may be excellent without deterioration in thermal properties.

For example, the compound represented by Formula 1 may have a kinematic viscosity (25° C.) of 10 to 20,000 cSt, 10 to 15,000 cSt, or 10 to 10,000 cSt, preferably greater than 5 cSt and less than 200 cSt, more preferably 10 to 100 cSt, still more preferably greater than 10 cSt and less than 100 cSt, still more preferably 10 to 50 cSt, most preferably to 50 cSt. In this case, plating properties such as plating adhesion, thermal properties, and plating appearance may be excellent, and occurrence of non-plating may be prevented. In addition, processability may be excellent.

In the present invention, kinematic viscosity may be obtained by dividing absolute viscosity by density, and absolute viscosity may be measured at 25° C. according to ASTM D445-46T.

For example, the compound represented by Formula 1 may include one or more selected from the group consisting of terminally modified or unmodified polydimethylsiloxane and terminally modified or unmodified polymethylphenylsiloxane. Preferably, the compound is terminally modified or unmodified polymethylphenylsiloxane. In this case, the amount of gas generated during injection-molding may be reduced, and heat resistance may be increased, thereby improving thermal properties, plating adhesion, and appearance.

Terminal modification commonly used in the art may be used in the present invention without particular limitation.

Thermoplastic Resin Composition

For example, the thermoplastic resin composition of the present invention may be a resin composition for plating, and may include one or more additives selected from the group consisting of heat stabilizers, antioxidants, impact modifiers, light stabilizers, plasticizers, lubricants, and antistatic agents within a content range that does not affect physical properties. In this case, the function of the additives may be implemented without deterioration in the inherent physical properties of the thermoplastic resin composition of the present invention.

For example, the additives may be contained in an amount of 0.1 to 10 parts by weight or 1 to 5 parts by weight based on 100 parts by weight of the base resin. Within this range, the function of the additives may be implemented without deterioration in the inherent physical properties of the thermoplastic resin composition of the present invention.

For example, the thermoplastic resin composition of the present invention may have a melt index (220° C., 10 kg) of 10 to 40 g/10 min or 10 to 30 g/10 min, preferably 15 to 30 g/10 min, more preferably 18 to 30 g/10 min. Within this range, physical property balance and processability may be excellent.

For example, the thermoplastic resin composition of the present invention may have an impact strength of 20 kgf·cm/cm$^2$ or more or 20 to 40 kgf·cm/cm$^2$, preferably 20 to 36 kgf·cm/cm$^2$, more preferably 23 to 36 kgf·cm/cm$^2$. Within this range, physical property balance may be excellent.

For example, the thermoplastic resin composition of the present invention may have a plating adhesion (10 mm/80 mm) of 10 N/cm or more or 10 to 25 N/cm, preferably 10 to 16 N/cm. Within this range, after plating, appearance and physical property balance may be excellent.

Hereinafter, the method of preparing the thermoplastic resin composition of the present invention and the metal-plated molded article including the thermoplastic resin composition will be described in detail. In describing the method and the metal-plated molded article, the above description of the thermoplastic resin composition is included.

Metal-Plated Molded Article

For example, the metal-plated molded article of the present invention may be manufactured by molding the thermoplastic resin composition of the present invention, and a metal plating layer may be formed on the surface of the metal-plated molded article. In this case, plating adhesion between the surface and the plating film and appearance may be improved.

The metal plating layer may be coupled to the surface of a substrate consisting of the thermoplastic resin composition via anchoring coupling. In this case, plating adhesion between the surface and the plating film and appearance may be improved.

For example, the method of manufacturing the metal-plated molded article may include a step of injection-molding the thermoplastic resin composition of the present invention to obtain an injection-molded article; a step of etching the injection-molded article using an etching solution; and a step of plating the etched injection-molded article. In this case, plating adhesion may be excellent without deterioration in mechanical and thermal properties.

For example, the thermoplastic resin composition may be extrusion pellets. In this case, reproducibility, process stability, and processability may be improved.

The etching process is a process of dissolving rubber portions inside an ABS-based resin to impart irregularities on the surface of the ABS-based resin. Through this process, rubber is melted to form holes, and the formed holes act as anchoring sites that allow physical bonding between a plating film and the ABS-based resin. That is, the formed holes increase plating adhesion and impart polarity to the surface of the resin, thereby suppressing the occurrence of a non-plating phenomenon during the following plating process.

For example, in the etching step, the etching time may be 2 to 10 minutes or 3 to 7 minutes, and etching temperature may be 60 to 75° C. or 65 to 70° C. Within this range, a molded article having excellent plating adhesion and thermal properties may be obtained at low process cost.

For example, the etching solution may include one or more aqueous solutions selected from the group consisting of chromium trioxide solution, sulfuric acid solution, phosphoric acid solution, potassium permanganate solution, and hydrogen peroxide solution. In this case, plating adhesion may be excellent without deterioration in mechanical and thermal properties.

For example, the method of manufacturing the metal-plated molded article may include, before the etching step, a degreasing step of removing oil from the injection-molded article.

In the degreasing step, the injection-molded article is preferably treated with a surfactant to remove oil. Surfactants for degreasing commonly used in the art to which the present invention pertains may be used as the surfactant of the present invention without particular limitation.

The degreasing step is preferably performed at 40 to 60° C. for 1 to 30 minutes, more preferably at 50 to 60° C. for 5 to 10 minutes. Within this range, degreasing efficiency may be excellent.

For example, the plating step may include a plating pretreatment step including one or more of a neutralization step, a catalysis step, and an activation step and a plating step including one or more of a chemical plating step and an electroplating step.

The neutralization step is preferably performed by treatment with a hydrochloric acid solution. In this case, residual chromic acid may be efficiently removed.

The neutralization step is preferably performed at 20 to 30° C. for 15 seconds to 1 minute, more preferably at 25 to 30° C. for 20 to 30 seconds. Within this range, residual chromic acid may be efficiently removed.

The catalysis step is preferably a step of absorbing metal to the anchor holes using a metal catalyst. Metal catalysts for plating pretreatment commonly used in the art to which the present invention pertains may be used as the metal catalyst of the present invention without particular limitation. For example, a palladium-tin catalyst is preferably used as the metal catalyst. In this case, palladium is adsorbed in the anchor holes.

The catalysis step is preferably performed at 20 to ° C. for 1 to 10 minutes, more preferably at 25 to 35° C. for 1 to 5 minutes. Within this range, the metal may be effectively adsorbed to the anchor holes.

The activation step is preferably performed by treatment with a sulfuric acid solution. In this case, metal species other than the metal species to be adsorbed to the anchor holes may be removed, thereby activating the metal adsorbed to the anchor holes.

The activation step is preferably performed at 45 to 65° C. for 1 to 10 minutes, more preferably at 50 to 60° C. for 1 to 5 minutes. Within this range, activation efficiency may be improved.

The chemical plating is preferably electroless plating using a metal salt, and the metal salt is preferably nickel sulfate.

The chemical plating is preferably performed at 20 to 40° C. for 1 to 30 minutes, more preferably at 25 to 35° C. for 1 to 10 minutes. Within this range, electroless plating properties may be excellent.

The electroplating preferably includes one or more selected from the group consisting of copper electroplating, nickel electroplating, and chromium electroplating.

In the copper electroplating, copper salts for copper electroplating commonly used in the art to which the present invention pertains may be used without particular limitation. For example, copper sulfate is preferably used.

The copper electroplating is preferably performed at 20 to 30° C. for 20 to 60 minutes at a current density of 2 to 4 A/dm$^2$, more preferably at 23 to 27° C. for 30 to 40 minutes at a current density of 2.5 to 3.5 A/dm$^2$.

In the nickel electroplating, nickel salts for nickel electroplating commonly used in the art to which the present invention pertains may be used without particular limitation. For example, nickel sulfate is preferably used.

The nickel electroplating is preferably performed at 50 to 60° C. for 10 to 30 minutes at a current density of 2 to 4 A/dm$^2$, more preferably at 55 to 60° C. for 10 to 20 minutes at a current density of 2.5 to 3.5 A/dm$^2$.

In the chromium electroplating, chromium compounds for chromium electroplating commonly used in the art to which the present invention pertains may be used without particular limitation. For example, chromium trioxide is preferably used.

The chromium electroplating is preferably performed at 45 to 65° C. for 1 to 15 minutes at a current density of 10 to 20 A/dm$^2$, more preferably at 50 to 60° C. for 1 to 5 minutes at a current density of 13 to 18 A/dm$^2$.

In the plating step, plating methods are not particularly limited, and plating methods commonly used in the art may be used.

The use of the molded article is not particularly limited, but the molded article is preferably an interior or exterior material for automobiles. In this case, in terms of plating reliability, the molded article may satisfy a user who purchases an automobile.

Method of Preparing Thermoplastic Resin Composition

For example, the method of preparing a thermoplastic resin composition according to the present invention includes a step of feeding a thermoplastic resin composition into a twin-screw extruder and melt-kneading and extruding the thermoplastic resin composition, wherein the thermoplastic resin composition includes 100 parts by weight of a base resin including 5 to 40% by weight of a vinyl cyanide compound-conjugated diene rubber-aromatic vinyl compound graft copolymer (a) containing conjugated diene rubber having a particle diameter of 0.05 μm to 0.2 μm, 5 to 40% by weight of a vinyl cyanide compound-conjugated diene rubber-aromatic vinyl compound graft copolymer (b) containing conjugated diene rubber having a particle diameter of greater than 0.2 μm and less than or equal to 0.5 μm, and 50 to 80% by weight of an aromatic vinyl compound-vinyl cyanide compound copolymer (c); and 0.01 to 2 parts by weight of a compound represented by Formula 1 below:

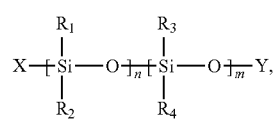

[Formula 1]

wherein X is hydrogen or a hydroxyl group, Y is hydrogen or

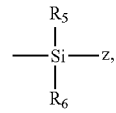

$R_1$ and $R_2$ are each independently an alkyl group having 1 to 10 carbon atoms, $R_3$ and $R_4$ are each independently an aryl group having 6 to 12 carbon atoms or an alkyl group having 1 to 10 carbon atoms, $R_5$ and $R_6$ are each independently an alkyl group having 1 to 10 carbon atoms, Z is hydrogen or a hydroxyl group, n is an integer of 1 to 100, and m is an integer of 0 to 100, wherein the kinematic viscosity (25° C.) of the compound represented by Formula 1 is 10 to 20,000 cSt. According to the present invention, non-plating may be prevented under conditions that promote the occurrence of a non-plating phenomenon. In addition, the thermoplastic resin composition of the present invention may have excellent thermal properties, plating adhesion, and appearance while maintaining mechanical properties equal or superior to those of conventional resins.

Preferably, the method of preparing a thermoplastic resin composition according to the present invention includes a step of feeding a thermoplastic resin composition into a twin-screw extruder and melt-kneading and extruding the thermoplastic resin composition, wherein the thermoplastic resin composition includes 100 parts by weight of a base resin including 5 to 40% by weight of a vinyl cyanide compound-conjugated diene rubber-aromatic vinyl compound graft copolymer (a) containing conjugated diene rubber having a particle diameter of 0.05 μm to 0.2 μm, 5 to 40% by weight of a vinyl cyanide compound-conjugated diene rubber-aromatic vinyl compound graft copolymer (b) containing conjugated diene rubber having a particle diameter of greater than 0.2 μm and less than or equal to 0.5 μm, and 50 to 80% by weight of an aromatic vinyl compound-vinyl cyanide compound copolymer (c); and more than 0.01 parts by weight and less than 2 parts by weight of a compound represented by Formula 1 below:

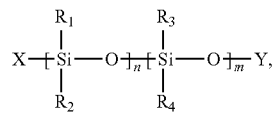

[Formula 1]

wherein X is hydrogen or a hydroxyl group, Y is hydrogen or

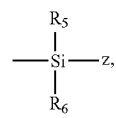

$R_1$ and $R_2$ are each independently an alkyl group having 1 to 10 carbon atoms, $R_3$ and $R_4$ are each independently an aryl group having 6 to 12 carbon atoms or an alkyl group having 1 to 10 carbon atoms, $R_5$ and $R_6$ are each independently an alkyl group having 1 to 10 carbon atoms, Z is hydrogen or a hydroxyl group, n is an integer of 1 to 100, and m is an integer of 0 to 100, wherein the content of the vinyl cyanide compound-conjugated diene rubber-aromatic vinyl compound graft copolymer (a) is less than that of the vinyl cyanide compound-conjugated diene rubber-aromatic vinyl compound graft copolymer (b), and the kinematic viscosity (25° C.) of the compound represented by Formula 1 is greater than 5 cSt and less than 200 cSt. According to the present invention, non-plating may be prevented, and the thermoplastic resin composition of the present invention may have excellent plating adhesion, thermal properties, and appearance. In addition, the thermoplastic resin composition may be suitable as a resin composition for plating due to excellent processability.

For example, the melt-kneading step may include the additives described above.

For example, the melt-kneading and extruding step may be performed using one or more selected from the group consisting of a single screw extruder, a twin-screw extruder, and a Banbury mixer, preferably a twin-screw extruder. A composition is evenly mixed using a twin-screw extruder and is extruded to obtain a thermoplastic resin composition in the form of pellets. In this case, deterioration in mechanical and thermal properties and occurrence of non-plating may be prevented, and plating adhesion and appearance may be excellent.

The description of the thermoplastic resin composition used in the method of preparing a thermoplastic resin composition according to the present invention includes all the descriptions of the above-mentioned thermoplastic resin composition of the present invention.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 8 and Comparative Examples 1 to 12 below are as follows:

a) The vinyl cyanide compound-conjugated diene rubber-aromatic vinyl compound graft copolymer: An ABS resin (DP229M, LG Chemical Co., Ltd.) containing rubber having a particle diameter of 0.1 μm b) The vinyl cyanide compound-conjugated diene rubber-aromatic vinyl compound graft copolymer: An ABS resin (DP270M, LG Chemical Co., Ltd.) containing rubber having a particle diameter of 0.3 μm c) The aromatic vinyl compound-vinyl cyanide compound copolymer: A styrene-acrylonitrile copolymer (95 RF, LG Chemical Co., Ltd.)

d-1) The compound represented by Formula 1: Polydimethylsiloxane (PDMS) (KF96-10cs, Shin-Etsu Chemical Co., Ltd.) having a kinematic viscosity of 10 cSt d-2) The compound represented by Formula 1: Polymethylphenylsiloxane (PMPS) (KF56, Shin-Etsu Chemical Co., Ltd.) having a kinematic viscosity of 15 cSt d-3) The compound represented by Formula 1: Polydimethylsiloxane (PDMS) (KF96-50cs, Shin-Etsu Chemical Co., Ltd.) having a kinematic viscosity of 50 cSt d-4) The compound represented by Formula 1: Polydimethylsiloxane (PDMS) (KF96-200cs, Shin-Etsu Chemical Co., Ltd.) having a kinematic viscosity of 200 cSt d-5) The compound represented by Formula 1: Polydimethylsiloxane (PDMS) (KF96H-10,000cs, Shin-Etsu Chemical Co., Ltd.) having a kinematic viscosity of 10,000 cSt d-6) The compound represented by Formula 1: Polydimethylsiloxane (PDMS) (KF96L-5cs, Shin-Etsu Chemical Co., Ltd.) having a kinematic viscosity of 5 cSt d-7) The compound represented by Formula 1: Polymethylphenylsiloxane (PMPS) (KF50, Shin-Etsu Chemical Co., Ltd.) having a kinematic viscosity of 3,000 cSt Examples 1 to 8 and Comparative Examples 1 to 12

Each component was added to a twin-screw extruder according to the composition and content shown in Tables 1 and 2 below, and melting and kneading were performed at 220 to 250° C. to prepare a resin composition in the form of pellets. The prepared resin composition in the form of pellets was injection-molded to prepare specimens for measuring physical properties. In this case, a square specimen of 100 mm×100 mm×3 mm size and a cap-shaped specimen of 150 mm×80 mm×3 mm size were respectively prepared.

A plating film having a thickness of 30 μm or more was uniformly formed on the prepared specimen according to the following method.

First, the specimen was treated with surfactant at 55° C. for 5 minutes to remove oil, and oxidation of butadiene was performed using chromium trioxide-sulfuric acid solution as an etchant at 65° C. for 5 minutes. Thereafter, the specimen was treated with hydrochloric acid solution at 25° C. for 25 seconds to remove residual chromic acid. Then, a palladium-tin catalyst was added to the specimen and was incubated at 30° C. for 2 minutes to facilitate the adsorption of palladium to anchor holes. An activation step was performed at 55° C. for 2 minutes using sulfuric acid solution to remove tin, and electroless plating was performed at 30° C. for 5 minutes using nickel sulfate. After electroless plating, electroplating was performed using copper, nickel, and chromium. Copper electroplating using copper sulfate was performed at 25° C. for 35 minutes at a current density of 3 A/dm$^2$, nickel electroplating using nickel sulfate was performed at 55° C. for 15 minutes at a current density of 3 A/dm$^2$, and chromium electroplating using chromium trioxide solution was performed at 55° C. for 3 minutes at a current density of 15 A/dm$^2$.

Test Example

The properties of specimens prepared in Examples 1 to 10 and Comparative Examples 1 to 12 were measured according to the following methods, and the results are shown in Table 2 below.

Melt index (g/10 min): The melt index of the prepared specimen was measured under conditions of 220° C. and 10 ka according to standard measurement ASTM D1238.

Notched Izod impact strength (kgf·cm/cm$^2$): The Notched Izod impact strength of the prepared specimen was measured according to standard measurement ASTM D256. In this case, specimens having a thickness of 6.4 mm were used for the measurement.

Plating adhesion (N/cm) : A 10 mm-wide scratch was applied to the front face of a plated square specimen (100 mm×100 mm×3 mm size), and the degree of plating adhesion was measured while peeling the specimen by a distance of 80 mm in the vertical direction using a Push-Pull gage. The average value of measured values was calculated, and the average values are shown in Tables 1 and 2.

Evaluation of occurrence of non-plating: The appearance of a cap-shaped specimen of 150 mm×80 mm×3 mm size was observed with the naked eye. In the case wherein there was no non-plated portion, it was marked as "o". In the case wherein any non-plated portions were observed, it was marked as "X".

Heat shock test: For cap-shaped specimens, the following steps ① to ⑤ were performed in a chamber. Then, the appearance of a plating film was observed with the naked eye. In the case wherein no cracks and plating bulges occurred, it was marked as "o". In the case wherein any cracks and plating bulges occurred, it was marked as "X".

① Maintaining temperature inside a chamber at −40° C. for 60 minutes
② Raising the temperature inside the chamber to 80° C. within 1 minute
③ Maintaining the temperature inside the chamber at 80° C. for 60 minutes
④ Lowering the temperature inside the chamber to −40° C. within 1 minute
⑤ Repeating processes ① to ④ four times Plating appearance: After plating the cap-shaped specimen, the appearance of the specimen was observed with the naked eye (except for non-dated portions). In the case wherein fogging was not observed at the outermost part of the specimen, it was marked as "Good". In the case wherein fogging was observed at the outermost part of the specimen, it was marked as "Poor".

TABLE 1

| Classification | Examples | | | | | | | | | |
|---|---|---|---|---|---|---|---|---|---|---|
| | 1 | 2 | 3 | 4 | 5 | 6 | 7 | 8 | 9 | 10 |
| a | 10 | 10 | 10 | 10 | 10 | 10 | 10 | 15 | 6 | 5 |
| b | 20 | 20 | 20 | 20 | 20 | 20 | 30 | 25 | 24 | 25 |
| c | 70 | 70 | 70 | 70 | 70 | 70 | 60 | 60 | 70 | 70 |
| d-1 | 0.2 | — | — | — | — | — | — | — | — | — |
| d-2 | — | 0.2 | — | — | — | — | — | — | — | — |
| d-3 | — | — | 0.05 | 0.2 | 0.5 | 1 | 0.2 | 0.2 | 0.2 | 0.2 |
| d-4 | — | — | — | — | — | — | — | — | — | — |
| d-5 | — | — | — | — | — | — | — | — | — | — |
| d-6 | | | | | | | | | | |
| d-7 | | | | | | | | | | |
| Melt index | 28 | 28 | 28 | 30 | 28 | 27 | 22 | 18 | 35 | 35 |
| Notched Izod impact strength | 24 | 23 | 24 | 25 | 25 | 27 | 36 | 34 | 28 | 29 |
| Plating adhesion | 11 | 11 | 10 | 12 | 11 | 11 | 14 | 16 | 10 | 8 |
| Occurrence of non-plating | ○ | ○ | ○ | ○ | ○ | ○ | ○ | ○ | ○ | ○ |
| Heat shock test | ○ | ○ | ○ | ○ | ○ | ○ | ○ | ○ | ○ | ○ |
| Plating appearance | | | | | Good | | | | | |

TABLE 2

| Classification | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| a | 10 | 10 | 10 | 10 | 10 | 10 | 10 | — | 30 | 20 | 5 | 20 |
| b | 20 | 20 | 20 | 20 | 20 | 20 | 20 | 30 | — | 20 | 10 | 40 |
| c | 70 | 70 | 70 | 70 | 70 | 70 | 70 | 70 | 70 | 60 | 85 | 40 |
| d-1 | — | — | — | — | — | — | — | — | — | — | — | — |
| d-2 | — | — | — | — | — | — | — | — | — | — | — | — |
| d-3 | — | 0.01 | 2 | — | — | — | — | 0.2 | 0.2 | 0.2 | 0.2 | 0.2 |
| d-4 | — | — | — | 0.2 | — | — | — | — | — | — | — | — |
| d-5 | — | — | — | — | 0.2 | — | — | — | — | — | — | — |
| d-6 | | | | | | 0.2 | | | | | | |
| d-7 | | | | | | | 0.2 | | | | | |
| Melt index | 30 | 29 | 27 | 28 | 28 | 30 | 28 | 33 | 16 | 12 | 42 | 8 |
| Notched Izod impact strength | 24 | 24 | 27 | 24 | 25 | 23 | 24 | 28 | 13 | 32 | 10 | 40 |
| Plating adhesion | 8 | 9 | 4 | 6 | 5 | 10 | 6 | 5 | 10 | 14 | 3 | 17 |
| Occurrence of non-plating | X | X | ○ | ○ | ○ | ○ | ○ | ○ | ○ | ○ | X | ○ |
| Heat shock test | ○ | ○ | X | X | X | ○ | X | X | X | X | X | X |
| Plating appearance | | Good | | | Poor | | | | Good | | | |

In Tables 1 and 2, the content of each of "a", "b", and "c" is given in % by weight based on 100% by weight of a base resin, and the content of "d" is given in parts by weight based on 100 parts by weight of the base resin. As shown in Table 1, in the case of Examples 1 to 9 of the present invention, since two types of ABS-based resins each containing rubber particles having different particle diameters, a SAN resin, and the compound (siloxane resin) represented by Formula 1 having a specific kinematic viscosity value are contained in specific amounts, processability may be excellent due to proper melt index, and Notched Izod impact strength, plating adhesion, and thermal properties are greatly improved.

In addition, according to the present invention, since etching time is shortened in a conventional plating process, the occurrence of non-plating is suppressed even under conditions that promote occurrence of non-plating, and mechanical and thermal properties are improved. In particular, plating adhesion is greatly improved.

For reference, in Example 10 in which the weight ratio of the graft copolymer (a) to the graft copolymer (b) is 1:5, plating adhesion is somewhat reduced, but melt index and Notched Izod impact strength is excellent. In addition, referring to the results of occurrence of non-plating, a heat shock test, and plating appearance, it can be confirmed that quality is excellent.

On the other hand, as shown in Table 2, in the case of Comparative Examples 1 and 2 in which the siloxane resin (d) is not contained or the content range of the present invention is not used, the occurrence of non-plating is observed. In the case of Comparative Example 3 in which the silicone resin (d) is used in an amount exceeding the content range of the present invention, plating adhesion is significantly reduced. In addition, after heat shock evaluation, bulges or cracks occur in a plating film, indicating that thermal properties are poor.

In addition, in the case of Comparative Examples 4, 5, and 7 in which the kinematic viscosity of the siloxane resin (d) is greater than 200 cSt, plating adhesion is significantly reduced. In addition, after heat shock evaluation, bulges or cracks occur in a plating film, indicating that thermal properties are poor. In the case of Comparative Example 6 in which the kinematic viscosity of the silicone resin (d) is less than 5 cSt, plating appearance is very poor.

In addition, in the case of Comparative Example 8 in which the ABS resin containing rubber having a large particle diameter is included, plating adhesion is significantly reduced. In addition, after heat shock evaluation, bulges or cracks occur in a plating film, indicating that thermal properties are poor. In the case of Comparative Examples 9 and 10 in which the ABS resin containing rubber having a small particle diameter is included, or the content of the ABS resin (a) is the same as that of the ABS resin (b), fluidity is reduced. In addition, after heat shock evaluation, bulges or cracks occur in a plating film, indicating that thermal properties are poor.

In addition, in the case of Comparative Example 11 in which the styrene-acrylonitrile copolymer (c) is contained in an amount of 85% by weight that exceeds the content range of the present invention, Notched Izod impact strength and plating adhesion are significantly reduced, and non-plating occurs. In addition, after heat shock evaluation, bulges or cracks occur in a plating film, indicating that thermal properties are poor. On the contrary, in the case of Comparative Example 12 in which the styrene-acrylonitrile copolymer (c) is contained in an amount of 40% by weight that is below the content range of the present invention, fluidity is reduced. In addition, after heat shock evaluation, bulges or cracks occur in a plating film, indicating that thermal properties are poor.

In conclusion, when the ABS resin (a), the ABS resin (b), the SAN resin (c), and the siloxane resin (d) are included to satisfy the content range of the present invention, plating properties such as plating adhesion, thermal properties, and plating appearance may be excellent, and non-plating may be prevented. In addition, due to excellent processability, the composition of the present invention may be suitable as a resin composition for plating.

The invention claimed is:

1. A thermoplastic resin composition, comprising:
100 parts by weight of a base resin comprising 5 to 40% by weight of a vinyl cyanide compound-conjugated diene rubber-aromatic vinyl compound graft copolymer (a) containing conjugated diene rubber having a particle diameter of 0.05 μm to 0.2 μm, 5 to 40% by weight of a vinyl cyanide compound-conjugated diene rubber-aromatic vinyl compound graft copolymer (b) containing conjugated diene rubber having a particle diameter of greater than 0.2 μm and less than or equal to 0.5 μm, and 50 to 80% by weight of an aromatic vinyl compound-vinyl cyanide compound copolymer (c); and
more than 0.01 parts by weight and less than 2 parts by weight of a compound represented by Formula 1 below:

[Formula 1]

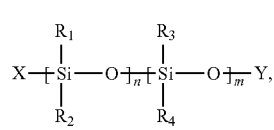

wherein X is hydrogen or a hydroxyl group, Y is hydrogen or

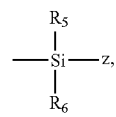

$R_1$ and $R_2$ are each independently an alkyl group having 1 to 10 carbon atoms, $R_3$ and $R_4$ are each independently an alkyl group having 1 to 10 carbon atoms, $R_5$ and $R_6$ are each independently an alkyl group having 1 to 10 carbon atoms, Z is hydrogen or a hydroxyl group, n is an integer of 1 to 100, and m is an integer of 0 to 100,
wherein a content of the vinyl cyanide compound-conjugated diene rubber-aromatic vinyl compound graft copolymer (a) is less than a content of the vinyl cyanide compound-conjugated diene rubber-aromatic vinyl compound graft copolymer (b), and a kinematic viscosity at 25° C. of the compound represented by Formula 1 is greater than 5 cSt and less than 200 cSt.

2. The thermoplastic resin composition according to claim 1, wherein the weight ratio of the vinyl cyanide compound-conjugated diene rubber-aromatic vinyl compound graft copolymer (a) to the vinyl cyanide compound-conjugated diene rubber-aromatic vinyl compound graft copolymer (b) is 1:1.5 to 4.

3. The thermoplastic resin composition according to claim 1, wherein the compound represented by Formula 1 has a kinematic viscosity at 25° C. of 10 to 100 cSt.

4. The thermoplastic resin composition according to claim 1, wherein the vinyl cyanide compound-conjugated diene rubber-aromatic vinyl compound graft copolymer (a) is prepared by graft-polymerizing 30 to 70% by weight of conjugated diene rubber having a particle diameter of 0.05 μm to 0.2 μm, 5 to 30% by weight of a vinyl cyanide compound, and 15 to 50% by weight of an aromatic vinyl compound.

5. The thermoplastic resin composition according to claim 1, wherein the vinyl cyanide compound-conjugated diene rubber-aromatic vinyl compound graft copolymer (b) is prepared by graft-polymerizing 40 to 80% by weight of conjugated diene rubber having a particle diameter of greater than 0.2 μm and less than or equal to 0.5 μm, 3 to 20% by weight of a vinyl cyanide compound, and 10 to 50% by weight of an aromatic vinyl compound.

6. The thermoplastic resin composition according to claim 1, wherein the aromatic vinyl compound-vinyl cyanide compound copolymer (c) comprises 55 to 85% by weight of an aromatic vinyl compound and 15 to 45% by weight of a vinyl cyanide compound.

7. The thermoplastic resin composition according to claim 1, wherein the thermoplastic resin composition has a plating adhesion of 10 N/cm or more using a width of 10 mm over 80 mm of travel.

8. The thermoplastic resin composition according to claim 1, wherein the thermoplastic resin composition has a melt index of 10 to 40 g/10 min at 220° C. and 10 kg.

9. The thermoplastic resin composition according to claim 1, wherein the thermoplastic resin composition is a resin composition for plating.

10. The thermoplastic resin composition according to claim 1, wherein the thermoplastic resin composition further comprises one or more selected from the group consisting of heat stabilizers, antioxidants, impact modifiers, light stabilizers, plasticizers, lubricants, and antistatic agents.

11. A method of preparing a thermoplastic resin composition, the method comprising:
feeding a thermoplastic resin composition into a twin-screw extruder and melt-kneading and extruding the thermoplastic resin composition,
wherein the thermoplastic resin composition comprises 100 parts by weight of a base resin comprising 5 to 40% by weight of a vinyl cyanide compound-conjugated diene rubber-aromatic vinyl compound graft copolymer (a) containing conjugated diene rubber having a particle diameter of 0.05 μm to 0.2 μm, 5 to 40% by weight of a vinyl cyanide compound-conjugated diene rubber-aromatic vinyl compound graft copolymer (b) containing conjugated diene rubber having a particle diameter of greater than 0.2 μm and less than or equal to 0.5 μm, and 50 to 80% by weight of an aromatic vinyl compound-vinyl cyanide compound copolymer (c); and more than 0.01 parts by weight and less than 2 parts by weight of a compound represented by Formula 1 below:

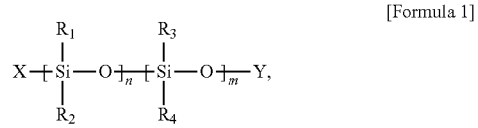
[Formula 1]

wherein X is hydrogen or a hydroxyl group, Y is hydrogen or

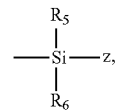

$R_1$ and $R_2$ are each independently an alkyl group having 1 to 10 carbon atoms, $R_3$ and $R_4$ are each independently an alkyl group having 1 to 10 carbon atoms, $R_5$ and $R_6$ are each independently an alkyl group having 1 to 10 carbon atoms, Z is hydrogen or a hydroxyl group, n is an integer of 1 to 100, and m is an integer of 0 to 100,
wherein a content of the vinyl cyanide compound-conjugated diene rubber-aromatic vinyl compound graft copolymer (a) is less than a content of the vinyl cyanide compound-conjugated diene rubber-aromatic vinyl compound graft copolymer (b), and a kinematic viscosity at 25° C. of the compound represented by Formula 1 is greater than 5 cSt and less than 200 cSt.

12. A metal-plated molded article, wherein the metal-plated molded article is manufactured by molding the thermoplastic resin composition of claim 1, and a metal plating layer is formed on a surface of the metal-plated molded article.

13. The metal-plated molded article according to claim 12, wherein the metal plating layer is formed using one or more selected from the group consisting of copper, nickel, and chromium.

14. The metal-plated molded article according to claim 12, wherein the metal-plated molded article is an interior or exterior material for automobiles.

15. A method of manufacturing a metal-plated molded article, the method comprising:
injection-molding the thermoplastic resin composition of claim 1 to obtain an injection-molded article;
etching the injection-molded article using an etching solution; and
plating the etched injection-molded article.

* * * * *